US012632792B2

(12) United States Patent
Ma et al.

(10) Patent No.: US 12,632,792 B2
(45) Date of Patent: May 19, 2026

(54) STABLE LOCAL INTERPRETABLE MODEL FOR PREDICTION

(71) Applicant: International Business Machines Corporation, Armonk, NY (US)

(72) Inventors: Xiao Ming Ma, Xi'an (CN); Si Er Han, Xi'an (CN); Xue Ying Zhang, Xi'An (CN); Wen Pei Yu, Xi'An (CN); Jing Xu, Xi'An (CN); Jing James Xu, Xi'An (CN); Lei Gao, Xi'An (CN); A Peng Zhang, Xi'An (CN)

(73) Assignee: International Business Machines Corporation, Armonk, NY (US)

( * ) Notice: Subject to any disclaimer, the term of this patent is extended or adjusted under 35 U.S.C. 154(b) by 843 days.

(21) Appl. No.: 17/699,613

(22) Filed: Mar. 21, 2022

(65) Prior Publication Data

US 2023/0306312 A1 Sep. 28, 2023

(51) Int. Cl.
*G06N 20/10* (2019.01)

(52) U.S. Cl.
CPC .................................... *G06N 20/10* (2019.01)

(58) Field of Classification Search
CPC ..................................................... G06N 20/10
See application file for complete search history.

(56) References Cited

U.S. PATENT DOCUMENTS

2017/0024660 A1* 1/2017 Chen ....................... G06N 5/045
2018/0300629 A1* 10/2018 Kharaghani ........... G06N 3/084

2019/0019096 A1* 1/2019 Yoshida .............. G06F 16/9024
2019/0050727 A1* 2/2019 Anderson ................ G06N 3/08
2020/0218982 A1* 7/2020 Annau ................ G06F 7/49963
2021/0192376 A1 6/2021 Sarferaz
2022/0351501 A1* 11/2022 Dong ..................... G06V 10/22

OTHER PUBLICATIONS

Chu; "Opening Black-Box Models with LIME—Beauty and the Beast"; Retrieved Online from https://towardsdatascience.com/opening-black-box-models-with-lime-beauty-and-the-beast-9daaf02f584a; May 10, 2020; 14 Pages.
Ribeiro et al.; "Why Should I Trust You? Explaining the Predictions of Any Classifier"; Retrieved Online from DOI: http://dx.doi.org/10.1145/2939672.2939778; KDD 2016 San Francisco, CA, USA; 2016; 10 Pages.
Visani et al.; "OptiLIME: Optimized LIME Explanations for Diagnostic Computer Algorithms"; Retrieved Online from arXiv:2006.05714v2 [cs.LG]; Jul. 29, 2020; 7 Pages.

(Continued)

*Primary Examiner* — Jennifer N Welch
*Assistant Examiner* — Amy P Hoang
(74) *Attorney, Agent, or Firm* — CANTOR COLBURN LLP; Steven Bouknight

(57) ABSTRACT

Examples described herein provide a computer-implemented method that includes determining a kernel width for the machine learning model. The method further includes building a local interpretable linear model using the kernel width. The method further includes computing a contribution and confidence for a feature of the local interpretable linear model. The method further includes updating the local interpretable linear model to generate a final model and computing an overall confidence for the final model.

15 Claims, 9 Drawing Sheets

101

111

(56) References Cited

OTHER PUBLICATIONS

Visani et al.; "Statistical Stability Indices for LIME: Obtaining Reliable Explanations for Machine Learning Models"; Retrieved Online from arXiv:2001.11757v2 [cs.LG]; Nov. 12, 2020; 18 Pages.
Zhou et al.; "S-LIME: Stabilized-LIME for Model Explanation"; Retrieved Online from arXiv:2106.07875v1 [stat.ML]; Jun. 15, 2021; 10 Pages.

* cited by examiner

400

500

| Model | Kernel width | Coefficient | accuracy |
|---|---|---|---|
| $M_{B1}$ | $0.75 + £$ | $\beta 1_{B1}, \beta 2_{B1}, \ldots$ | $Acc_{B1}$ |
| $M_{B2}$ | $0.75 + 2£$ | $\beta 1_{B2}, \beta 2_{B2}, \ldots$ | $Acc_{B2}$ |
| ... | | | |
| $M_{Bn}$ | $0.75 + n£$ | $\beta 1_{Bn}, \beta 2_{Bn}, \ldots$ | $Acc_{Bn}$ |

501

| Model | Kernel width | Coefficient | accuracy |
|---|---|---|---|
| $M_{S1}$ | $0.75 - £$ | $\beta 1_{S1}, \beta 2_{S1}, \ldots$ | $Acc_{S1}$ |
| $M_{S2}$ | $0.75 - 2£$ | $\beta 1_{S2}, \beta 2_{S2}, \ldots$ | $Acc_{S2}$ |
| ... | | | |
| $M_{Sn}$ | $0.75 - n£$ | $\beta 1_{Sn}, \beta 2_{Sn}, \ldots$ | $Acc_{Sn}$ |

600

1

STABLE LOCAL INTERPRETABLE MODEL FOR PREDICTION

BACKGROUND

Embodiments described herein generally relate to machine learning, and more specifically, to a stable local interpretable model for prediction.

The phrase "machine learning" broadly describes a function of electronic systems that learn from data. A machine learning system, engine, and/or module can include a trainable machine learning algorithm that can be trained to learn functional relationships between inputs and outputs that are currently unknown, and the resulting machine learning model can be used for performing a task associated with the training, such as to predict an output based on input data. Machine learning functionality can be implemented using an artificial neural network (ANN) having the capability to be trained to perform a currently unknown function. In machine learning and cognitive science, ANNs are a family of statistical learning models inspired by the biological neural networks of animals, and in particular the brain. ANNs can be used to estimate or approximate systems and functions that depend on a large number of inputs.

SUMMARY

In one exemplary embodiment, a computer-implemented method for a stable local interpretable model for prediction is provided. The method includes determining a kernel width for the machine learning model. The method further includes building a local interpretable linear model using the kernel width. The method further includes computing a contribution and confidence for a feature of the local interpretable linear model. The method further includes updating the local interpretable linear model to generate a final model and computing an overall confidence for the final model.

In addition to one or more of the features described herein, or as an alternative, further embodiments of the method may include building a default local model with a default kernel width value, building deviating local models having gradually increasing and gradually decreasing kernel widths until reaching a stop condition, and selecting a final kernel width based at least in part on the default local model and the deviating local models. In addition to one or more of the features described herein, or as an alternative, further embodiments of the method may include that the stop condition is at least one of a maximum number of iterations, a convergence condition being satisfied, or an accuracy satisfying a threshold.

In addition to one or more of the features described herein, or as an alternative, further embodiments of the method may include that computing the overall confidence for the final model is based at least in part on the contribution and confidence for the feature of the local interpretable linear model.

In addition to one or more of the features described herein, or as an alternative, further embodiments of the method may include computing an additional contribution and confidence for an additional feature of the local interpretable linear model. In addition to one or more of the features described herein, or as an alternative, further embodiments of the method may include that the additional contribution and confidence for the additional feature are used to compute the overall confidence for the final model.

In another exemplary embodiment a method for determining a kernel width for a machine learning model includes building a default local model with a default kernel width value. The method further includes building deviating local models having gradually increasing and gradually decreasing kernel widths until reaching a stop condition. The method further includes selecting a final kernel width based at least in part on the default local model and the deviating local models.

In addition to one or more of the features described herein, or as an alternative, further embodiments of the system may include that the final kernel width is selected from the gradually increasing and gradually decreasing kernel widths based at least in part on identifying a kernel width that causes convergence.

In addition to one or more of the features described herein, or as an alternative, further embodiments of the system may include that the final kernel width is selected as the default kernel width responsive to not identifying a kernel width that causes convergence during the building the deviating local models having gradually increasing and gradually decreasing kernel widths.

Other embodiments described herein implement features of the above-described method in computer systems and computer program products.

According to one or more embodiments described herein, selecting a kernel width causes the model to be more stable. One or more embodiments described herein provide a confidence for the local interpretable model for better application. One or more embodiments described herein provide for evaluating the stability of each feature's contribution and provide a corresponding confidence to let a user focus on the proper feature in application.

The above features and advantages, and other features and advantages, of the disclosure are readily apparent from the following detailed description when taken in connection with the accompanying drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the scope of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

One or more embodiments of the present invention provide a stable local interpretable model for prediction. In machine learning, a machine learning model can be trained to predict an output based on input data. Classification is a subset of machine learning concerned with predicting to which of a set of categories an observation (i.e., input data) belongs. A trained algorithm to perform classification is referred to as a "classifier." These machine learning models, and particularly classifiers, are largely "black boxes" in that it is difficult to understand the reasoning behind these models' predictions.

One conventional approach to understanding predictions of classifiers is referred to as local interpretable model-agnostic explanations (LIME). Generally, LIME provides for identifying an interpretable model over an interpretable representation that is locally faithful to the classifier. LIME is further described in "'Why Should I Trust You?' Explaining the Predictions of Any Classifier" by Riberio et al., which is incorporated by reference herein in its entirety. A black-box model's complex decision function fis unknown to LIME and cannot be approximated well by a linear model. LIME samples instances to make predictions using the model's complex decision function $f$ and weighs them by proximity to an instance being explained. It may be observed that the learned explanation is locally, but not globally, faithful.

Figure 1B:
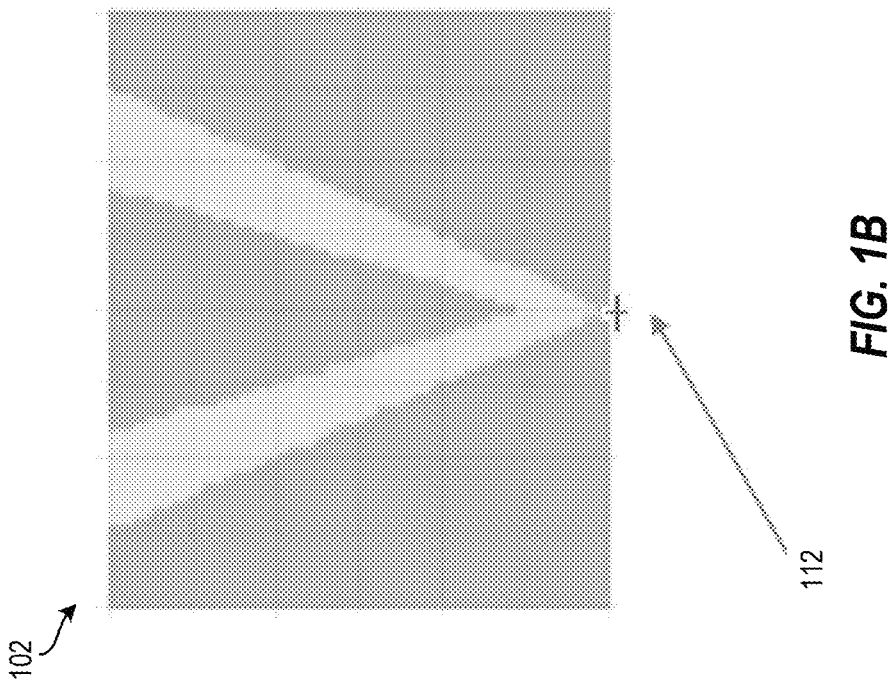
FIGS. 1A and 1B show example instances where linear models are not stable or confident.
Figure 1A:
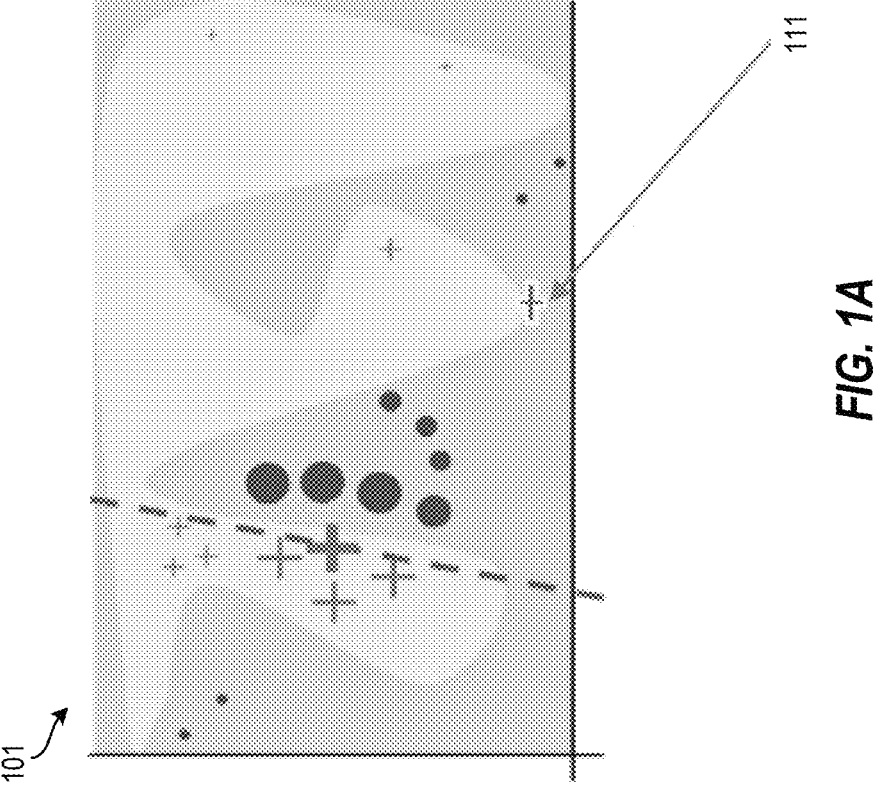

Conventional approaches, such as LIME, are not stable or confident for some instances, for example, where a linear model at a particular instance is not stable and/or the direction of the model is not stable. FIGS. 1A and 1B show example instances 111, 112 where linear models 101, 102 respectively are not stable or confident because the linear models 101, 102 at the position of the instances 111, 112 are not stable and the direction of the models 101, 102 is not stable.

Figure 2:
FIG. 2 depicts a plot of a black box prediction for different data values.

Further, conventional approaches, such as LIME, are sensitive to weights (distance to the explained instance) of instances. For example, FIG. 2 depicts a plot 200 of a black box prediction for different data values "x". This figure shows an explanation of the prediction for the instance x=1.6. The predictions of the black box model depending on a single feature is shown by the line 201 and the distribution of the data is shown with rugs 202. Three local surrogate models with different kernel widths, namely 0.1 (line 203), 0.75 (line 204), and 2 (line 205), are computed. The resulting linear regression model depends on the kernel width, and from the plot 100 it can then be determined whether the feature has a negative, positive, or neutral (no) effect for x=1.6. A small kernel width means that an instance is close to influence the local model while a larger kernel width means that the instances that are farther away also influence the model.

Thus, conventional approaches to understanding predictions of classifiers fail to provide for calculating and showing confidence of such approaches' result and fail to provide for selecting proper kernel width, which decides proper weights for records for building a local model.

One or more embodiments described herein address the shortcomings of the prior art by provide a stable local interpretable model for prediction. According to one or more embodiments described herein, a method is provided to select a kernel width ("kernel_width") to calculate weights for sampled instances to build a stable local model. According to one or more embodiments described herein, a method identifies a disturbance around features of the instance and computes a stability of the contribution of each feature and its associated confidence. According to one or more embodiments described herein, a final local interpretable model is updated and an overall confidence for the model can be calculated.

One or more embodiments of the present invention provide technological improvements over current methods of evaluating machine learning models that fail to consider kernel width and that fail to calculate and show confidence of the LIME approach's explanation result. One or more embodiments of the present invention provide technical solutions to one or more of these disadvantages of existing solutions by selecting a kernel width to make the model more stable, providing a confidence for the local interpretable model for better application, evaluating the stable of each feature's contribution and providing corresponding confidence to let a user focus on the proper feature in application, and/or the like, including combinations thereof.

Figure 3:
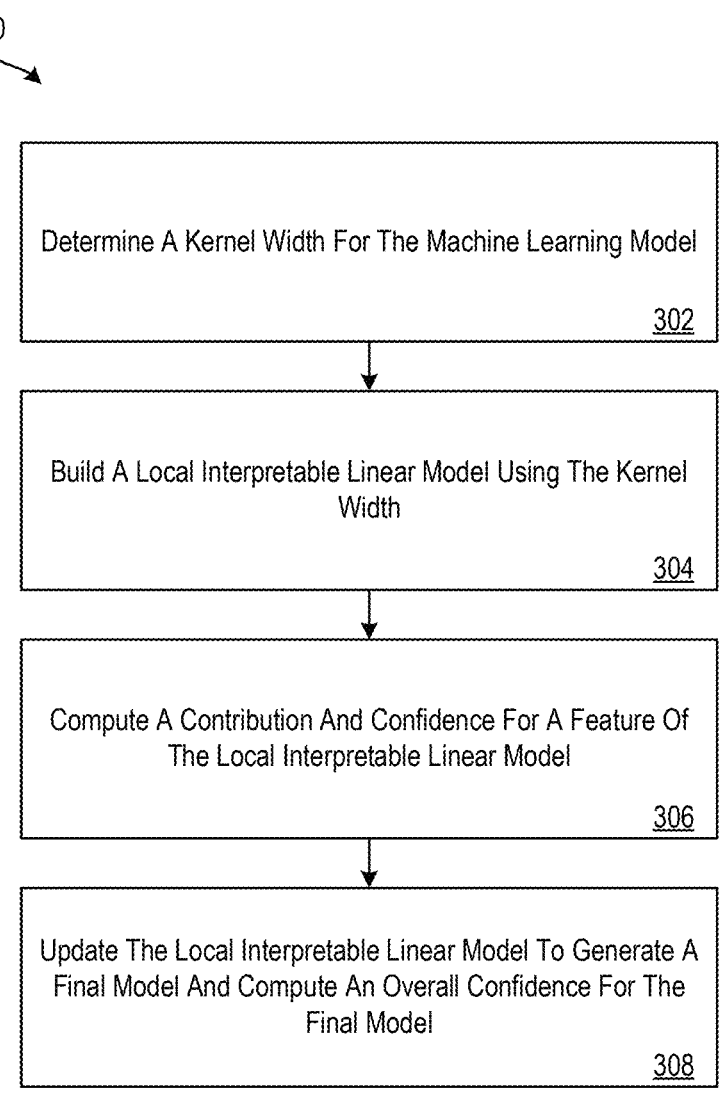
FIG. 3 depicts a flow diagram of a method for evaluating a machine learning model according to one or more embodiments described herein.

Turning now to FIG. 3, a flow diagram of a method 300 is providing for evaluating a machine learning model (e.g., an artificial neural network) according to one or more embodiments described herein. Particularly, the method 300 provides for building a stable local interpretable model for prediction according to one or more embodiments described herein. The method 300 can be implemented using any suitable system and/or device, such as the processing system 900 of FIG. 9, one or more cloud computing nodes 10 of FIG. 7, or the like, including combinations and/or multiples thereof.

At block 302, the processing system 900 determines a kernel width for the machine learning model being evaluated. The process for determining the kernel width is described in more detail herein with reference to FIGS. 4, 5A, and 5B.

Figure 4:
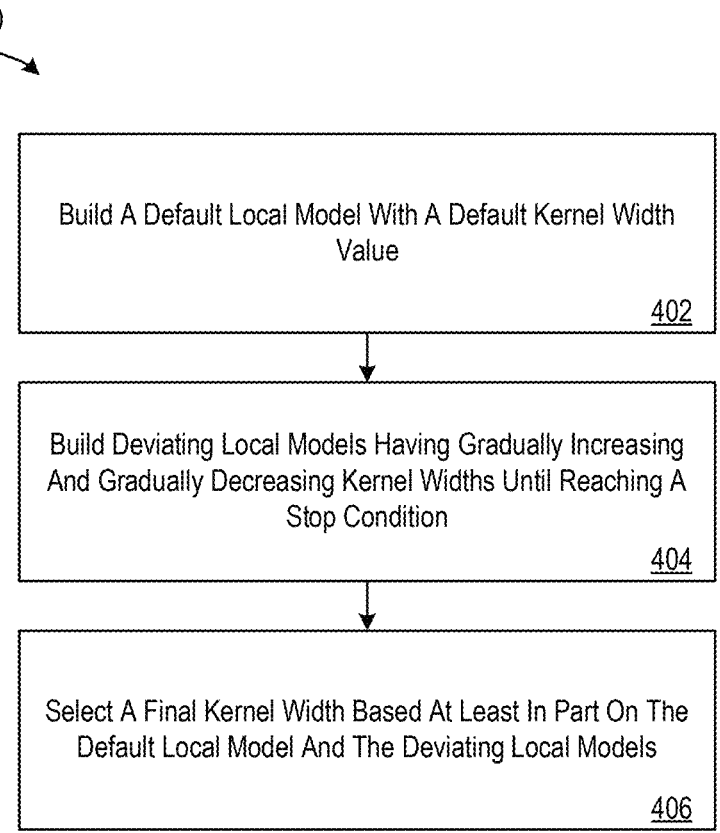
FIG. 4 depicts a flow diagram of a method for determining a kernel width for the machine learning model being evaluated in FIG. 3 according to one or more embodiments described herein.
Figure 6:
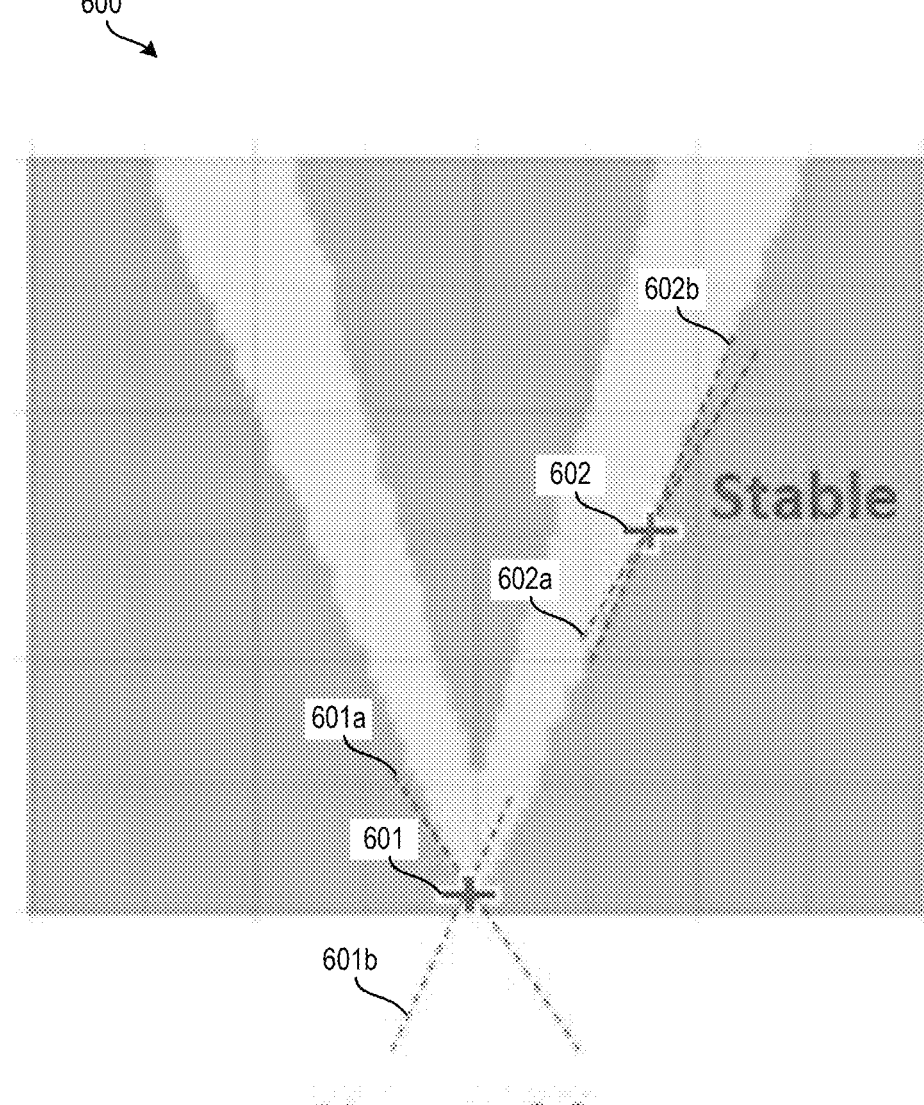
FIG. 6 depicts an example plot of the local interpretable model according to one or more embodiments described herein.

At block 304, the processing system 900 builds a local interpretable linear model using the kernel width determined at block 302 (see, e.g., FIG. 4). FIG. 6 depicts an example plot of the local interpretable model 600 according to one or more embodiments described herein. Two points, 601 and 602, are shown with the point 601 not being stable (also referred to as "unstable point 601") and the point 602 being stable (also referred to as "stable point 602"). Each of these points corresponds to a feature of the model 600. Consider an example prediction for whether a plant is poisonous or edible. The model 600 can be evaluated for one or more of these features such as odor, spore print color, stalk surface characteristics, and/or the like. Coefficients β of the features in the linear model are used as corresponding contribution of the prediction. The explanation of each feature is evaluated to determine whether stability exits. That is, it is determined whether the linear direction on the feature (e.g., the point

601, the point 602, etc.) remains stable when a disturbance around the value of the feature is observed. Regarding unstable point 601, it can be observed that, around the point 601, the model is unstable as shown by lines 601a, 601b. In contrast, it can be observed that the point 602 is stable as shown by the lines 602a, 602b. These determinations of stability/instability provide explanations of predictions of the model 600.

At 306, the processing system 900 computes a contribution and confidence for a feature (e.g., a feature $F_1$) of the local interpretable linear model (e.g., the model 600 of FIG. 6). For example, disturbances are generated "l" instances around an original explained instance (e.g., the feature $F_1$). The disturbance around a value V of the feature $F_1$ can be used to generate values $V+\alpha\Delta$ where $\Delta$ is a standard deviation of $F_1$ and $\alpha \in (-0.1, 0.1)$ and is randomly generated. According to one or more embodiments described herein, other features' values are kept constant (e.g., they remain unchanged). In some examples, multiple local linear models are generated for each instance, and the contribution $\beta 1_1$, $B 1_2$, . . . . $B 1_l$; for the feature $F_1$ is obtained while the original instance $F_1$'s contribution is $\beta 1_0$.

A final contribution and confidence for the feature F1 can then be computed. First, a value $\beta 1_{avg}$ and a value $\beta 1_{std}$ are computed to update the original local model using the following equation:

$$\beta 1_{avg} = \sum_0^l \beta 1_i / (l+1)$$

where "l" is the number of new generated instances.

The value $\beta 1_{avg}$ represents the contribution for the feature $F_1$. The standard deviation $B 1_{std}$ of the coefficients (e.g., $\beta 1_0$, $\beta 1_1$, $\beta 1_2$, . . . $\beta 1_l$) is can also be calculated using the following formula:

$$\beta 1_{std} = \sqrt{\frac{(\beta 10 - \beta 1_{avg})^2 + (\beta 11 - \beta 1_{avg})^2 + \dots (\beta 11 - \beta 1_{avg})^2}{l}}.$$

The accuracy $Acc_{F1}$ can then be computed for an updated model. As an example, $\beta 1_{avg}$ is used instead of the original $\beta 1_0$ update the model. Then, the updated model is used to compute prediction values with data for building the local model. The accuracy $Acc_{F1}$ represents the accuracy between a prediction value and original target values for building the local model.

The stability of the model for the feature $F_1$ can then be indicated by the following equation based on the determined average and standard deviation values:

$$\text{abs}(\beta 1_{std} / \beta 1_{avg}).$$

It should be appreciated that the stability is smaller as this value decreases.

The feature stability and accuracy of the updated model can then be combined to calculate a confidence for the feature $F_1$ using the following equation:

$$Conf_{F1} = \exp(-\text{abs}(\beta 1_{std} / \beta 1_{avg})) * Acc_{F1} \in (0, 1)$$

The resulting confidence ($Conf_{F1}$) is the final confidence for the contribution of feature $F_1$. That is, the value $Conf_{F1}$ represents the confidence for the feature $F_1$ Next, the contribution $\beta i_{avg}$ and the confidence $Conf_{Fi}$ are computed for features $F_1$ to $F_i$ using this approach to get the feature contribution for each feature $F_1$ to $F_i$.

At block 308, the processing system 900 updates the local interpretable linear model to generate a final model and computes an overall confidence for the final model. As an example, $\beta 1_{avg}$ is used instead of the original $\beta 1_0$ to get the updated model for each of the features. That is, an overall confidence for the instance prediction's explanation can be calculated using contribution $\beta i_{avg}$ and the confidence $Conf_{Fi}$ for each feature $F_1$ to $F_i$. Particularly, the overall confidence for the instance prediction's explanation can be calculated using the following equation:

$$Conf_{overall} = \left(\text{abs}(\beta 1_{avg}) / \sum_1^m \text{abs}(\beta i_{avg})\right) * Conf_{F1} +$$
$$\left(\text{abs}(\beta 2_{avg}) / \sum_1^m \text{abs}(\beta i_{avg})\right) * Conf_{F2} +$$
$$\dots + \left(\text{abs}(\beta m_{avg}) / \sum_1^m \text{abs}(\beta i_{avg})\right) * Conf_{Fm}$$

Additional processes also may be included, and it should be understood that the process depicted in FIG. 3 represents an illustration, and that other processes may be added or existing processes may be removed, modified, or rearranged without departing from the scope of the present disclosure.

Turning now to FIG. 4, a flow diagram of a method 400 is providing for determining a kernel width for the machine learning model being evaluated according to one or more embodiments described herein. The method 400 can be implemented using any suitable system and/or device, such as the processing system 900 of FIG. 9, one or more cloud computing nodes 10 of FIG. 7, or the like, including combinations and/or multiples thereof.

At block 402, the processing system 900 builds a default local model with a default kernel width value. For example, a local model (e.g., a linear model) $M_A$ with a default kernel width is built having model coefficients ($\beta 1_A$, $B 2_A$, . . . ) and an accuracy $ACC_A$. The default kernel width can be any suitable value, such as 0.75.

Figure 5A:
FIG. 5A depicts a table with local models being built with gradually increasing kernel widths according to one or more embodiments described herein.
Figure 5B:
FIG. 5B depicts a table with local models being built with gradually increasing kernel widths according to one or more embodiments described herein.

At block 404, the processing system 900 builds deviating local models having gradually increasing and gradually decreasing kernel widths until reaching a stop condition. That is, two sets of models are built: a first set of models having gradually increasing kernel widths and a second set of models having gradually decreasing kernel widths. This is shown in the tables of FIGS. 5A and 5B respectively. For example, FIG. 5A depicts a table 500 with local models $M_B$ (e.g., a first set of models) being built with gradually increasing kernel widths. In the table 500, each model of the first set of models (e.g., $M_{B1}$, $M_{B2}$, . . . . $M_{Bn}$,) is shown with respective kernel widths (e.g., 0.75+£, 0.75+2£, . . . 0.75+nf) gradually increasing by multiples of a value of £, model coefficients (e.g., ($\beta 1_{B1}$, $\beta 2_{B1}$, . . . ), ($\beta 1_{B2}$, $\beta 2_{B2}$, . . . ), . . . ($B 1_{Bn}$, $B 2_{Bn}$, . . . )), and accuracy (e.g., $Acc_{B1}$, $Acc_{B2}$, . . . . $Acc_{Bn}$) . . . . FIG. 5B depicts a table 501 with local models $M_S$ being built with gradually decreasing kernel widths. Similar to FIG. 5A, the table 501 of FIG. 5B shows each model of the second set of models (e.g., $M_{S1}$, $M_{S2}$, . . . . $M_{Sn}$,) with respective kernel widths (e.g., 0.75-£, 0.75-2£, . . . 0.75-nf) gradually decreasing by multiples of a value of £, model coefficients (e.g., ($\beta 1_{S1}$, $\beta 2_{S1}$, . . . ), ($\beta 1_{S2}$, $\beta2_{S2}, \ldots ), \ldots (\beta1_{Sn}, B2_{Sn}, \ldots ))$, and accuracy (e.g., $Acc_{S1}$, $Acc_{S2}, \ldots . Acc_{Sn}$). It should be appreciate that the value for £ can be any suitable value.

The deviating local models (e.g., the first set of models and the second set of models) are built until a stop condition is reached. As an example, the stop condition could be a maximum number of iterations (e.g., 5, 7, 10, 30, etc.). As another example, the stop condition could be that a convergence condition is satisfied. For example, a convergence can be said to be satisfied when the following equation is satisfied:

$$\sum\nolimits_{\beta1}^{\beta m} \left| \left( \left( \beta i_{S_n} - \beta i_{S_{n-1}} \right) / \beta i_A \right) \right| < \text{specified value.}$$

As another example, the stop condition could be when the model accuracy Acc satisfies a threshold. For example, if the model accuracy Acc is less than $Acc_A$, the stop condition is met.

Once the first and second sets of models are built at block 404, the method 400 continues to block 406 where, the processing system 900 selects a final kernel width based at least in part on the default local model and the deviating local models. For example, if the stop condition is a convergence condition, and it is determined that the convergence condition is satisfied, the final kernel width is selected to be a kernel width with which optimization reached convergence (e.g., that caused the convergence condition to be satisfied). As another example, if the stop condition is a maximum number of iterations, once the maximum number of iterations is met, then the final kernel width is selected to be the kernel width with a least value. In such an example, during the iterations, the following equation is becoming gradually smaller:

$$\sum\nolimits_{\beta1}^{\beta m} \left| \left( \left( \beta i_{S_n} - \beta i_{S_{n-1}} \right) / \beta i_A \right) \right|.$$

Otherwise, the default kernel width is selected as the final kernel width. This is, for example, the case when no convergence occurs.

Additional processes also may be included, and it should be understood that the process depicted in FIG. 4 represents an illustration, and that other processes may be added or existing processes may be removed, modified, or rearranged without departing from the scope of the present disclosure.

It is to be understood that, although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
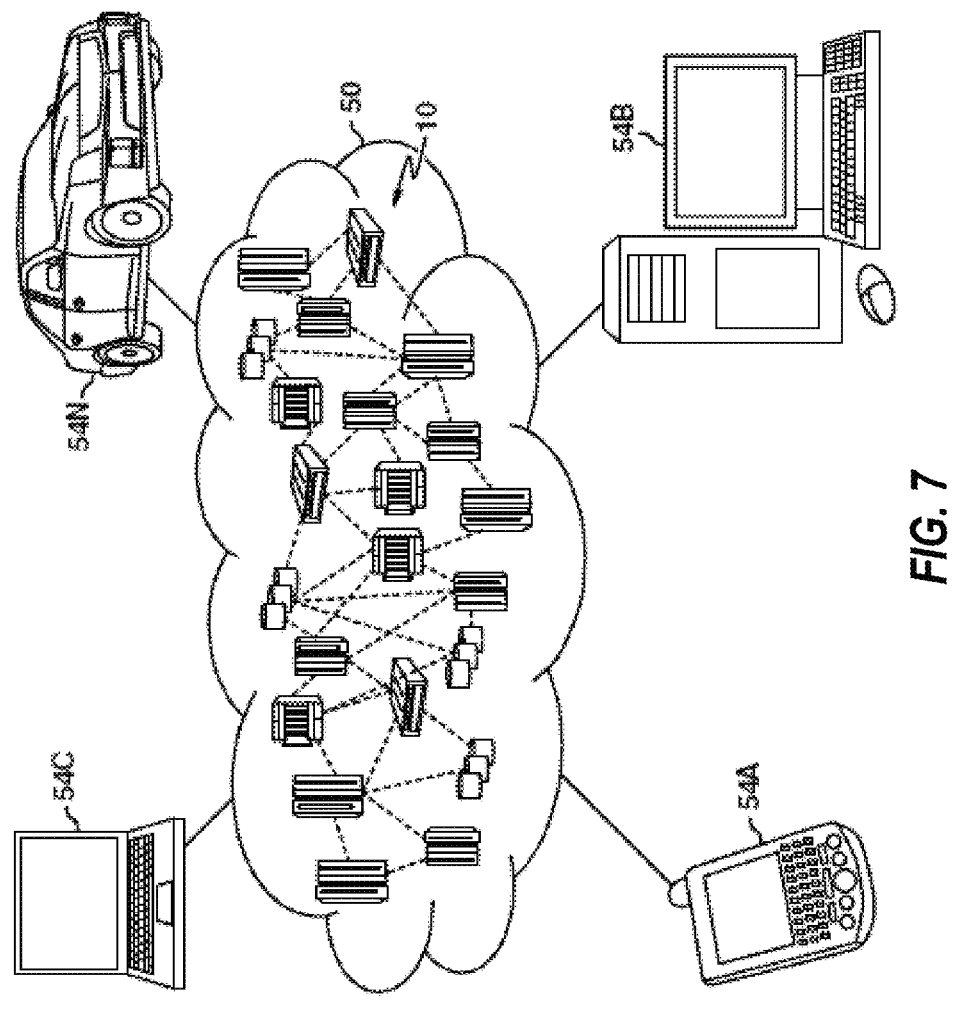
FIG. 7 depicts a cloud computing environment according to one or more embodiments described herein.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
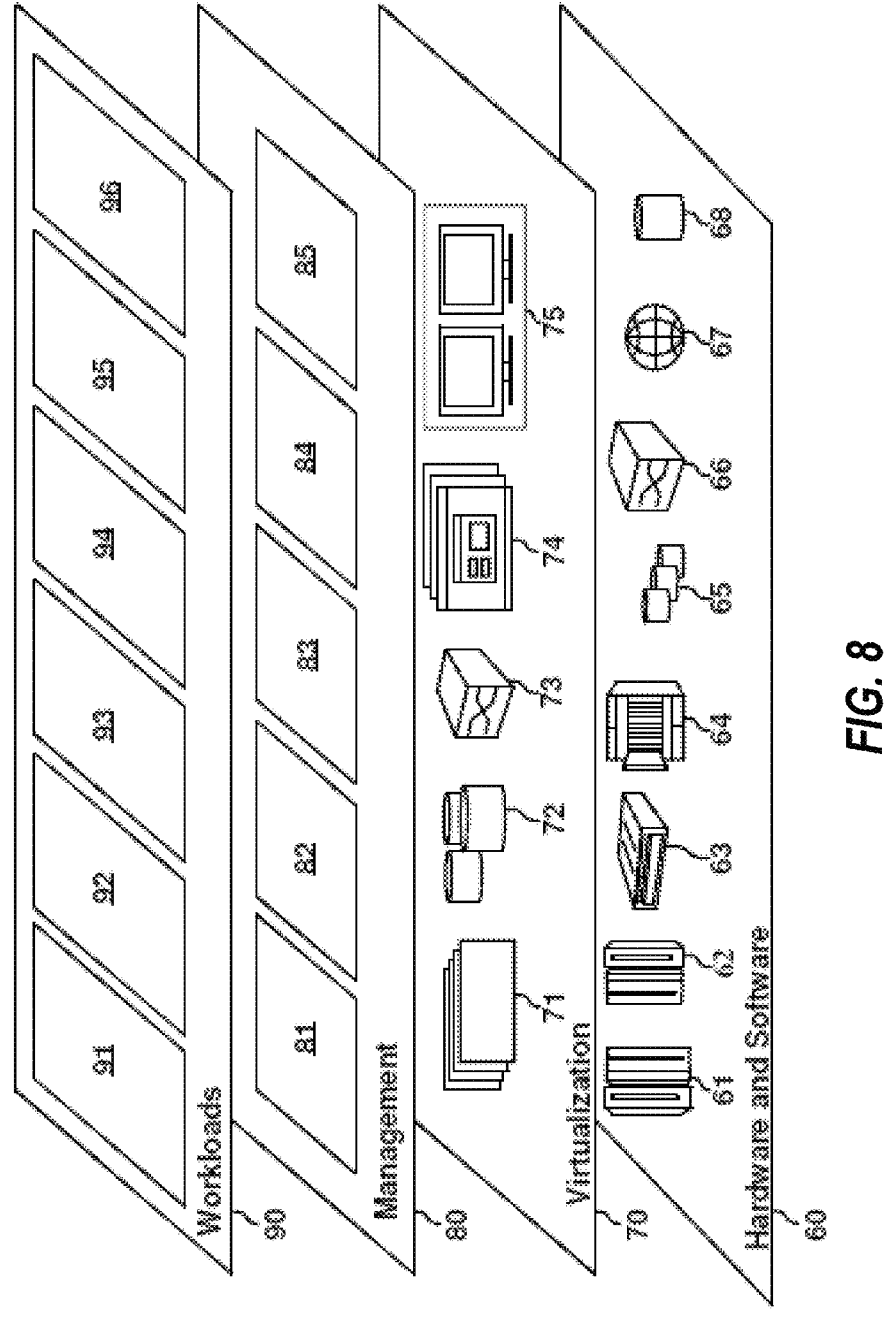
FIG. 8 depicts abstraction model layers according to one or more embodiments described herein.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and evaluating machine learning models 96.

Figure 9:
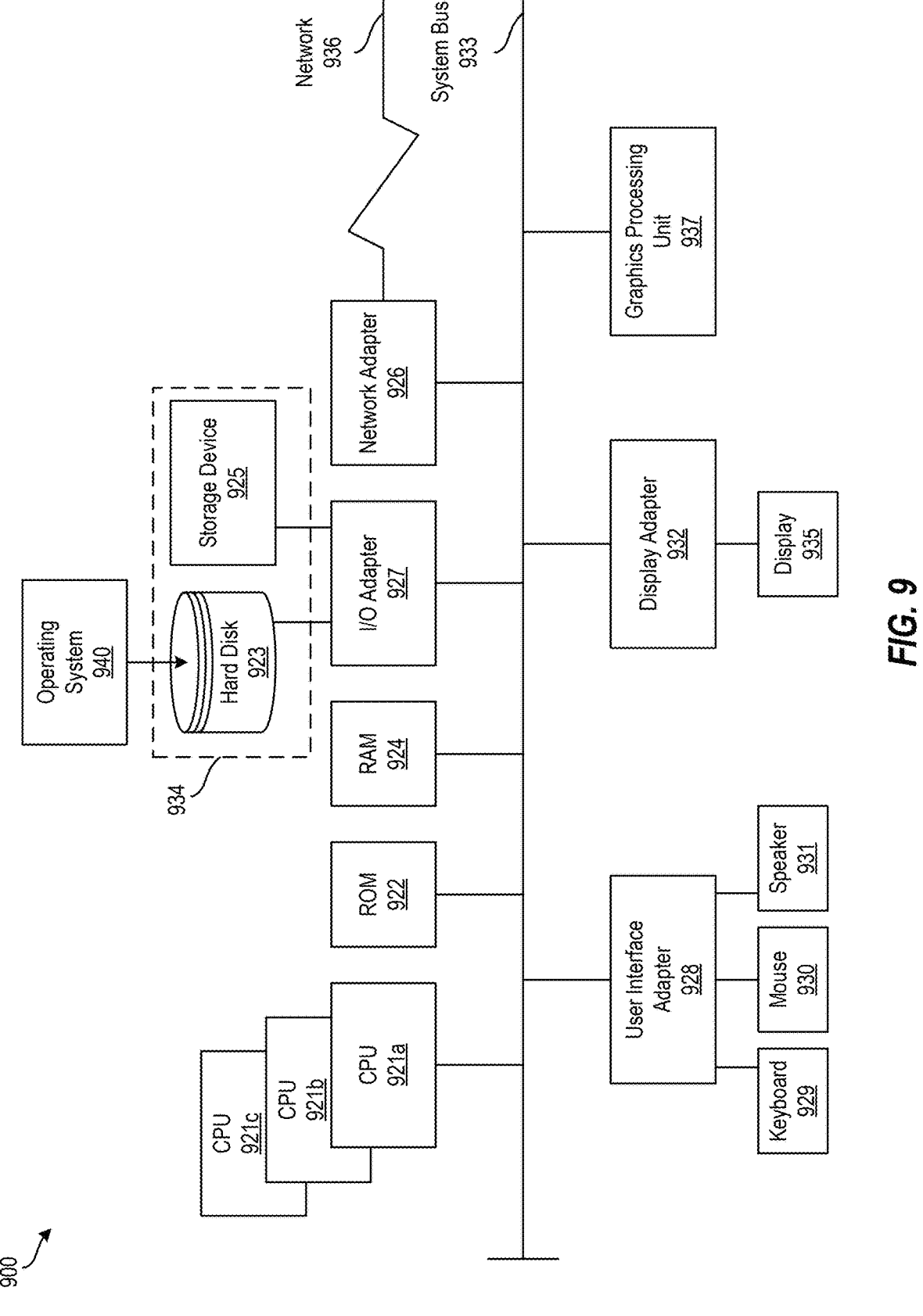
FIG. 9 depicts a block diagram of a processing system for implementing one or more embodiments described herein.

It is understood that one or more embodiments described herein is capable of being implemented in conjunction with any other type of computing environment now known or later developed. For example, FIG. 9 depicts a block diagram of a processing system 900 for implementing the techniques described herein. In accordance with one or more embodiments described herein, the processing system 900 is an example of a cloud computing node 10 of FIG. 7. In examples, processing system 900 has one or more central processing units ("processors" or "processing resources" or "processing devices") 921a, 921b, 921c, etc. (collectively or generically referred to as processor(s) 921 and/or as processing device(s)). In aspects of the present disclosure, each processor 921 can include a reduced instruction set computer (RISC) microprocessor. Processors 921 are coupled to system memory (e.g., random access memory (RAM) 924) and various other components via a system bus 933. Read only memory (ROM) 922 is coupled to system bus 933 and may include a basic input/output system (BIOS), which controls certain basic functions of processing system 900.

Further depicted are an input/output (I/O) adapter 927 and a network adapter 926 coupled to system bus 933. I/O adapter 927 may be a small computer system interface (SCSI) adapter that communicates with a hard disk 923 and/or a storage device 925 or any other similar component. I/O adapter 927, hard disk 923, and storage device 925 are collectively referred to herein as mass storage 934. Operating system 940 for execution on processing system 900 may be stored in mass storage 934. The network adapter 926 interconnects system bus 933 with an outside network 936 enabling processing system 900 to communicate with other such systems.

A display 935 (e.g., a display monitor) is connected to system bus 933 by display adapter 932, which may include a graphics adapter to improve the performance of graphics intensive applications and a video controller. In one aspect of the present disclosure, adapters 926, 927, and/or 932 may be connected to one or more I/O busses that are connected to system bus 933 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 933 via user interface adapter 928 and display adapter 932. A keyboard 929, mouse 930, and speaker 931 may be interconnected to system bus 933 via user interface adapter 928, which may include, for example, a Super I/O chip integrating multiple device adapters into a single integrated circuit.

In some aspects of the present disclosure, processing system 900 includes a graphics processing unit 937. Graphics processing unit 937 is a specialized electronic circuit designed to manipulate and alter memory to accelerate the creation of images in a frame buffer intended for output to a display. In general, graphics processing unit 937 is very efficient at manipulating computer graphics and image processing, and has a highly parallel structure that makes it more effective than general-purpose CPUs for algorithms where processing of large blocks of data is done in parallel.

Thus, as configured herein, processing system 900 includes processing capability in the form of processors 921, storage capability including system memory (e.g., RAM 924), and mass storage 934, input means such as keyboard 929 and mouse 930, and output capability including speaker 931 and display 935. In some aspects of the present disclosure, a portion of system memory (e.g., RAM 924) and mass storage 934 collectively store the operating system 940 such as the AIX® operating system from IBM Corporation to coordinate the functions of the various components shown in processing system 900.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for evaluating a machine learning model, the method comprising:

determining a kernel width for the machine learning model, wherein the kernel width is based at least in part on a first set of models having gradually increasing kernel values and a second set of models having gradually decreasing kernel values;

building a local interpretable linear model using the kernel width that is selected to improve the stability of the local interpretable linear model by evaluating whether a linear direction on a feature of the local interpretable linear model is observed;

computing a contribution and confidence for the feature of the local interpretable linear model, wherein computing the contribution and confidence for the feature comprises:

generating a plurality of disturbed instances around the feature by modifying a value of the feature while keeping values of other features constant;

generating, for the plurality of disturbed instances, multiple local linear models having respective contributions for the feature;

computing an average and a standard deviation of the contributions for the feature;

computing an accuracy of an updated model in which the average replaces an original contribution value for the feature; and computing the confidence for the feature based at least in part on the standard deviation, the average, and the accuracy; and updating, based on the confidence for the feature, the local interpretable linear model to generate a final model and computing an overall confidence for the final model, wherein computing the overall confidence for the final model is based at least in part on the contribution and confidence for the feature of the local interpretable linear model.

2. The computer-implemented method of claim 1, wherein determining the kernel width for the machine learning model comprises:

building a default local model with a default kernel width value;

building deviating local models having gradually increasing and gradually decreasing kernel widths until reaching a stop condition, the deviating local models comprising the first set of models having the gradually increasing kernel values and the second set of models having the gradually decreasing kernel values; and selecting a final kernel width based at least in part on the default local model and the deviating local models.

3. The computer-implemented method of claim 2, wherein the stop condition is at least one of a maximum number of iterations, a convergence condition being satisfied, or an accuracy satisfying a threshold.

4. The computer-implemented method of claim 1, further comprising computing an additional contribution and confidence for an additional feature of the local interpretable linear model.

5. The computer-implemented method of claim 4, wherein the additional contribution and confidence for the additional feature are used to compute the overall confidence for the final model.

6. A system comprising:

a memory comprising computer readable instructions;

a processing device for executing the computer readable instructions, the computer readable instructions controlling the processing device to perform operations for evaluating a machine learning model, the operations comprising:

determining a kernel width for the machine learning model, wherein the kernel width is based at least in part on a first set of models having gradually increasing kernel values and a second set of models having gradually decreasing kernel values;

building a local interpretable linear model using the kernel width that is selected to improve the stability of the local interpretable linear model by evaluating whether a linear direction on a feature of the local interpretable linear model is observed;

computing a contribution and confidence for the feature of the local interpretable linear model, wherein computing the contribution and confidence for the feature comprises:

generating a plurality of disturbed instances around the feature by modifying a value of the feature while keeping values of other features constant;

generating, for the plurality of disturbed instances, multiple local linear models having respective contributions for the feature;

computing an average and a standard deviation of the contributions for the feature;

computing an accuracy of an updated model in which the average replaces an original contribution value for the feature; and computing the confidence for the feature based at least in part on the standard deviation, the average, and the accuracy; and updating, based on the confidence for the feature, the local interpretable linear model to generate a final model and computing an overall confidence for the final model, wherein computing the overall confidence for the final model is based at least in part on the contribution and confidence for the feature of the local interpretable linear model.

7. The system of claim 6, wherein determining the kernel width for the machine learning model comprises:

building a default local model with a default kernel width value;

building deviating local models having gradually increasing and gradually decreasing kernel widths until reaching a stop condition, the deviating local models comprising the first set of models having the gradually increasing kernel values and the second set of models having the gradually decreasing kernel values; and selecting a final kernel width based at least in part on the default local model and the deviating local models.

8. The system of claim 7, wherein the stop condition is at least one of a maximum number of iterations, a convergence condition being satisfied, or an accuracy satisfying a threshold.

9. The system of claim 6, the operations further comprising computing an additional contribution and confidence for an additional feature of the local interpretable linear model.

10. The system of claim 9, wherein the additional contribution and confidence for the additional feature are used to compute the overall confidence for the final model.

11. A computer program product comprising a computer readable storage medium having program instructions embodied therewith, the program instructions executable by a processor to cause the processor to perform operations for evaluating a machine learning model, the method comprising:

determining a kernel width for the machine learning model, wherein the kernel width is based at least in part on a first set of models having gradually increasing kernel values and a second set of models having gradually decreasing kernel values;

building a local interpretable linear model using the kernel width that is selected to improve the stability of the local interpretable linear model by evaluating whether a linear direction on a feature of the local interpretable linear model is observed;

computing a contribution and confidence for the feature of the local interpretable linear model, wherein computing the contribution and confidence for the feature comprises:

generating a plurality of disturbed instances around the feature by modifying a value of the feature while keeping values of other features constant;

generating, for the plurality of disturbed instances, multiple local linear models having respective contributions for the feature;

computing an average and a standard deviation of the contributions for the feature;

computing an accuracy of an updated model in which the average replaces an original contribution value for the feature; and computing the confidence for the feature based at least in part on the standard deviation, the average, and the accuracy; and updating, based on the confidence for the feature, the local interpretable linear model to generate a final model and computing an overall confidence for the final model, wherein computing the overall confidence for the final model is based at least in part on the contribution and confidence for the feature of the local interpretable linear model.

12. The computer program product of claim 11, wherein determining the kernel width for the machine learning model comprises:

building a default local model with a default kernel width value;

building deviating local models having gradually increasing and gradually decreasing kernel widths until reaching a stop condition, the deviating local models comprising the first set of models having the gradually increasing kernel values and the second set of models having the gradually decreasing kernel values; and selecting a final kernel width based at least in part on the default local model and the deviating local models.

13. The computer program product of claim 12, wherein the stop condition is at least one of a maximum number of iterations, a convergence condition being satisfied, or an accuracy satisfying a threshold.

14. The computer program product of claim 11, the operations further comprising computing an additional contribution and confidence for an additional feature of the local interpretable linear model.

15. The computer program product of claim 14, wherein the additional contribution and confidence for the additional feature are used to compute the overall confidence for the final model.

\* \* \* \* \*